Sept. 3, 1940.　　　　N. P. LARSEN　　　　2,213,738

METER HOLDER

Filed April 19, 1938

INVENTOR.
NEIL P. LARSEN
BY Bates, Golrick, & Teare
ATTORNEYS

Patented Sept. 3, 1940

2,213,738

UNITED STATES PATENT OFFICE 2,213,738

METER HOLDER

Neil P. Larsen, Cleveland Heights, Ohio, assignor to The American Coach & Body Company, Cleveland, Ohio, a corporation of Ohio Application April 19, 1938, Serial No. 202,885

4 Claims. (Cl. 248—350)

This invention relates to instrument supports, and particularly to a resilient support for instruments which are transported by motor vehicles such as utility trucks. Due to road shock and other vibration, it is necessary to support a delicate instrument, such as an electric meter, in a rigid manner which is resilient enough to prevent damage to the instrument. The transportation of electric meters presents a particular problem, in that the base of the meter is made in a variety of shapes and sizes. To support such meters during transportation necessitates either an adjustable support or special equipment to accommodate each particular type or size of meter. In recent years, however, meters have been standardized to the extent that the face of the instrument cover is of the same size for various types of meters, irrespective of the size of their base. This standardization is utilized in the present invention by supporting the meters upon their face rather than upon their base as heretofore was the practice.

It is an object of my present invention, therefore, to provide a resilient transportation mounting for various types of electrical meters of standard design, irrespective of the shape or size of their base.

Figure 2:
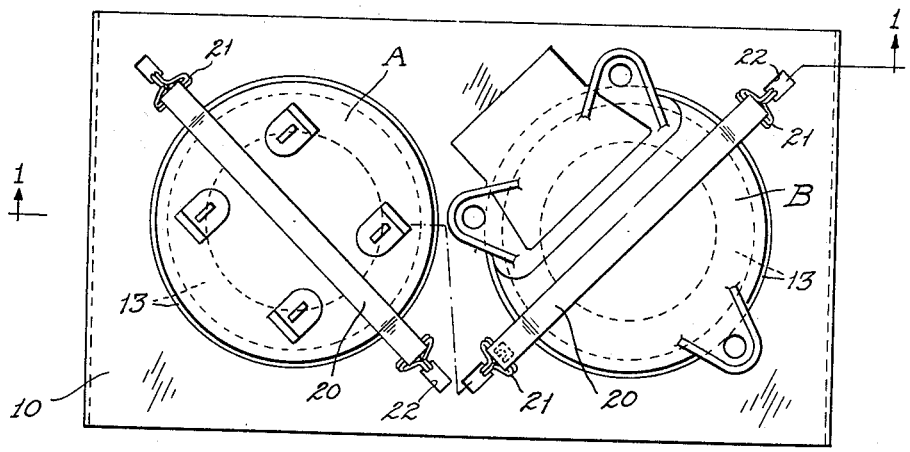
Figure 1:
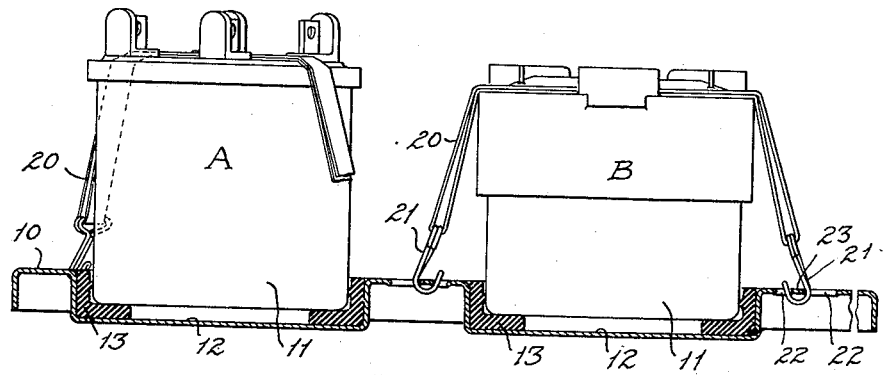
Figure 3:
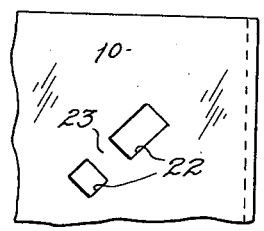
Figure 4:
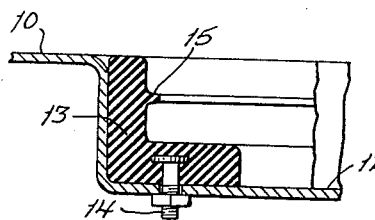

Referring now to the drawing, Fig. 1 is a sectional view through a series of instrument supports embodying my invention; Fig. 2 is a top plan view of the arrangement; Figs. 3 and 4 are enlarged views of two details of construction shown in Fig. 1.

To utilize all available space on utility trucks, electrical instruments are carried in a cabinet containing several rows of shelves. Each shelf may be either permanently attached or provided with slidable guides to facilitate removal of the instruments thereon. In Fig. 1, I have illustrated a shelf or base 10, having a series of supports arranged thereon for transporting various types of meters A and B each having a standard sized face cover 11. Each support comprises a depressed portion 12 having an annular resilient rubber ring 13 secured therein which is adapted to support the meter upon the face and edges of the cover 11. The resilient ring 13 may be snugly pressed into the depression 12 or it may be secured by suitable fastening means 14 as illustrated in the enlarged section in Fig. 4. An inwardly extending flange 15 may be molded as an integral part of the ring 13 to insure that the resilient ring snugly embraces the cover 11 to prevent lateral movement of the same during transportation.

To hold each meter firmly to its support, I provide an elastic band 20 which passes over the base of the meter and is secured to the shelf 10 by means of a hook 21 at each end thereof. The hooks 21 are fastened to the shelf through a pair of apertures 22 as illustrated in Fig. 3 permitting the hook to pass below the surface thereof and catch on the remaining metal 23. This arrangement provides a quick and easy way of attaching or detaching the band 20, thereby leaving the shelf free from obstruction, to facilitate the sliding of another meter into position.

If desired, one of the hooks on each mounting may be pinched together to prevent loss or misplacement of the elastic band 20, when the meter is removed from the mounting. It is apparent that the elastic band 20 is capable of quick removal or attachment and because of its elastic characteristic it may be used interchangeably for all types of meters.

A distinct advantage of my present invention is that the various types of standard meters, irrespective of their size or type, may be carried interchangeably in any one of the supports provided therefor.

I claim:

1. In an instrument carrier, a base having a base having a cup-shaped depression therein, a resilient support for an instrument disposed within said depression, and tensioning means attached to the base for holding the instrument in engagement with the support, said support being arranged so that an instrument may slide into place therein without lifting the same from the base.

2. In an instrument carrier, a base having a depression below the surface thereof, and a resilient support disposed within said depression for receiving the face of an instrument therein, tensioning means adapted to hold the instrument in engagement with the support, fastening means carried by said tensioning means, and means disposed within the base for engaging said fastening means, said last-named means being arranged so that an instrument may slide over the same and into the support, without lifting the instrument from the base.

3. An instrument carrier comprising a sheet metal shelf, a cup-like depression formed in the shelf, a resilient member mounted in the depression having a ring-like bottom portion engaging the wall thereof, there being openings in the shelf outside of the depression and adjacent to the same, and an elastic band adapted to extend over an instrument seated on the resilient member, said band having hooks with their ends adapted to occupy the openings in the shelf to anchor the band thereto.

4. An instrument carrier comprising a sheet metal shelf, a cup-like depression formed in the shelf, a resilient member mounted in the depression having a ring-like bottom portion engaging the wall thereof, there being an opening in the shelf outside of the depression and adjacent to the same, and an elastic band adapted to extend over an instrument seated on the resilient member, said band having one end anchored to the shelf and the other end provided with means for detachable connection in said opening.

NEIL P. LARSEN.